US011381109B2

(12) United States Patent
Antoniazza et al.

(10) Patent No.: US 11,381,109 B2
(45) Date of Patent: Jul. 5, 2022

(54) UNINTERRUPTIBLE POWER SUPPLY SYSTEM

(71) Applicant: ABB Schweiz AG, Baden (CH)

(72) Inventors: Alessandro Antoniazza, Cambiasca (IT); Gianluca Butti, Quartino (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/184,608

(22) Filed: Feb. 25, 2021

(65) Prior Publication Data
US 2021/0265858 A1  Aug. 26, 2021

(30) Foreign Application Priority Data

Feb. 26, 2020 (EP) .................................. 20159564

(51) Int. Cl.
*H02J 9/06* (2006.01)
(52) U.S. Cl.
CPC ................... *H02J 9/062* (2013.01)
(58) Field of Classification Search
CPC ..................................... H02J 9/062
USPC .............................. 307/64, 65, 66
See application file for complete search history.

(56) References Cited

U.S. PATENT DOCUMENTS

| 6,169,677 | B1 | 1/2001 | Kitahata et al. | |
| 7,847,535 | B2 | 12/2010 | Meynard et al. | |
| 2010/0109582 | A1 | 5/2010 | Gerd | |
| 2012/0106210 | A1* | 5/2012 | Xu | H02M 1/126 363/37 |
| 2014/0133201 | A1* | 5/2014 | Brandmeyer | H02J 9/061 363/65 |
| 2017/0077746 | A1 | 3/2017 | Kanakasabai et al. | |
| 2017/0085121 | A1* | 3/2017 | Cairoli | H02J 9/061 |
| 2017/0366041 | A1 | 12/2017 | Navarro | |
| 2018/0034314 | A1 | 2/2018 | Tomassi | |

FOREIGN PATENT DOCUMENTS

| CN | 103475248 A | 12/2013 |
| CN | 107947347 A | 4/2018 |
| DE | 3826524 A1 | 3/1989 |
| JP | H 11299252 A | 10/1999 |
| JP | 2008178180 A | 7/2008 |
| KR | 20010083809 A | 9/2001 |
| WO | 9010339 A1 | 9/1990 |
| WO | 2017053666 A1 | 3/2017 |

\* cited by examiner

*Primary Examiner* — Michael R. Fin
(74) *Attorney, Agent, or Firm* — Leydig, Voit & Mayer, Ltd.

(57) ABSTRACT

An uninterruptible power supply system includes: at least one AC input terminal; an AC output terminal; an DC input terminal; at least one uninterruptible power supply (UPS) device having: a DC link; a DC/AC converter connecting on a first side to the DC link and on a second side to the AC output terminal; and a DC/DC converter connecting on a first side to the DC input terminal and on second side to the DC link. The uninterruptible power supply system further includes at least two switches; and at least one coupled differential mode inductor having two windings. Each switch of the at least two switches is connected in series with at least one winding of the at least one coupled differential mode inductor forming a series connection. The series connection is connected on a first side to the at least one AC input terminal.

15 Claims, 6 Drawing Sheets

UNINTERRUPTIBLE POWER SUPPLY SYSTEM

CROSS-REFERENCE TO PRIOR APPLICATION

Priority is claimed to European Patent Application No. EP 20 159 564.2, filed on Feb. 26, 2020, the entire disclosure of which is hereby incorporated by reference herein.

FIELD

The invention relates to an uninterruptible power supply system, comprising at least one AC input terminal, an AC output terminal and an DC input terminal, at least one uninterruptible power supply, UPS, comprising a DC link, a DC/AC converter connecting on a first side to the DC link and on a second side to the AC output terminal, and a DC/DC converter connecting on a first side to the DC input terminal and on second side to the DC link.

BACKGROUND

Power quality events in electrical installations are an important issue. Power quality events comprise any kind of disturbances of an AC source covering from for example sags or failures of a single phase of the AC source up to outages of entire multi-phase AC source. In order to deal with power quality events, uninterruptible power supply devices and uninterruptible power supply systems provide uninterruptible power supply, UPS, to a load.

A typical UPS system respectively UPS device comprises an AC/DC converter, also referred to as rectifier, and an output DC/AC converter, also referred to as inverter. The AC/DC converter and the DC/AC output converter are inter-connected by a DC link having positive and negative bus bars respectively rails or simply links. The DC link usually has a midpoint reference, a positive reference and a negative reference, which are connected by two capacitances provided in series. The rectifier is often provided as half bridge boost converter maintaining a regulated split via the positive and negative rails of the DC link versus an internal and/or a source reference, such as commonly source Neutral. Furthermore, the AC/DC converter is connected at a power supply side of the UPS to an AC source, and the DC/AC output converter is connected at a load side of the UPS to a load, which is typically an AC load. Still further, the UPS comprises an additional DC/DC converter, also referred to as battery converter, and a DC source, whereby the DC/DC converter connects the DC source to the DC link. The DC source is typically a battery, which is charged via the DC/DC converter from the DC link. Each UPS device of such UPS system can be connected to an individual battery, or the UPS devices of the UPS system can share a single battery or multiple batteries. The battery or batteries can be integral part of the UPS device or UPS system, or they can be provided separately. In any case, operation of the UPS device or the UPS system does not change, since this is more a question of definition.

Today's UPS system are often characterized by a modular approach allowing for a very flexible and robust approach to system build. Such way system growth is simple to accommodate, both for redundancy and serviceability or overall reliability. As converters are intrinsically current controlling devices, load share is generally perfectly under control to an accuracy that is not a concern for individual power trains i.e. UPS devices operating in parallel. Such distributed architecture is an attractive alternative for a bypass of a UPS system, in particular for large systems where high short circuit currents and let through energy are of fundamental importance.

However, due to the nature of the semiconductor devices usually used, in particular silicon controlled rectifiers, SCR, aka thyristors, current share may pose a problem. Thereby it needs to be noted that such devices are in general naturally commutated so cannot readily operate as converters within a line cycle such as for example 50/60 Hz. Current share of said parallel devices depend on intrinsic differences among semiconductors due to construction tolerances and material characteristics. Parameters which affect the current share could be for example "Threshold Voltage", "Forward Voltage", Forward Slope Resistance", "Fall Time", Forward Recovery Time", "Temperature Coefficients" and so on. For instance, "Forward Voltage", Vf, and "Threshold Voltage, Vt, variation play a relevant role in current share between devices because a device with a larger current due to a lower Vf will get hotter, thus conducting an even larger current share of the total current because of the negative Vf coefficient of its silicon structure. Other differences in physical construction of the UPS system external to the semiconductor devices may further affect the current share among the semiconductors. Those differences could be unbalance in the passive current path, temperature differences among devices, gating delays and amplitude differences among devices, gross wire impedance mismatch and so on.

A distributed bypass is commonly used for practical solutions in UPS systems. Bypass power trains are often housed in UPS devices also housing the converters, whereby each UPS device is usually provided as a complete UPS formed of the usual AC-DC-AC converters, i.e. rectifier, stored energy with converter and inverter as described above, and the bypass. However, current share in bypass mode is a known issue with such approach, to a point compensated for by a balanced UPS system build, for example with impedances between the modules. UPS system scale, i.e. the number of UPS devices, increases said issue and has a tendency to get even worse in an unpredictable way. An alternate approach is to house parallel bypass power trains in a separate assembly, however the current share issue remains or may actually get more severe as the overall cabling is reduced by the more compact system build.

SUMMARY

In an embodiment, the present invention provides an uninterruptible power supply system, comprising: at least one AC input terminal; an AC output terminal; an DC input terminal; at least one uninterruptible power supply (UPS) device, comprising: a DC link; a DC/AC converter connecting on a first side to the DC link and on a second side to the AC output terminal; and a DC/DC converter connecting on a first side to the DC input terminal and on second side to the DC link, and at least two switches; and at least one coupled differential mode inductor having two windings, wherein each switch of the at least two switches is connected in series with at least one winding of the at least one coupled differential mode inductor forming a series connection, and wherein the series connection is connected on a first side to the at least one AC input terminal and on a second side to the AC output terminal.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
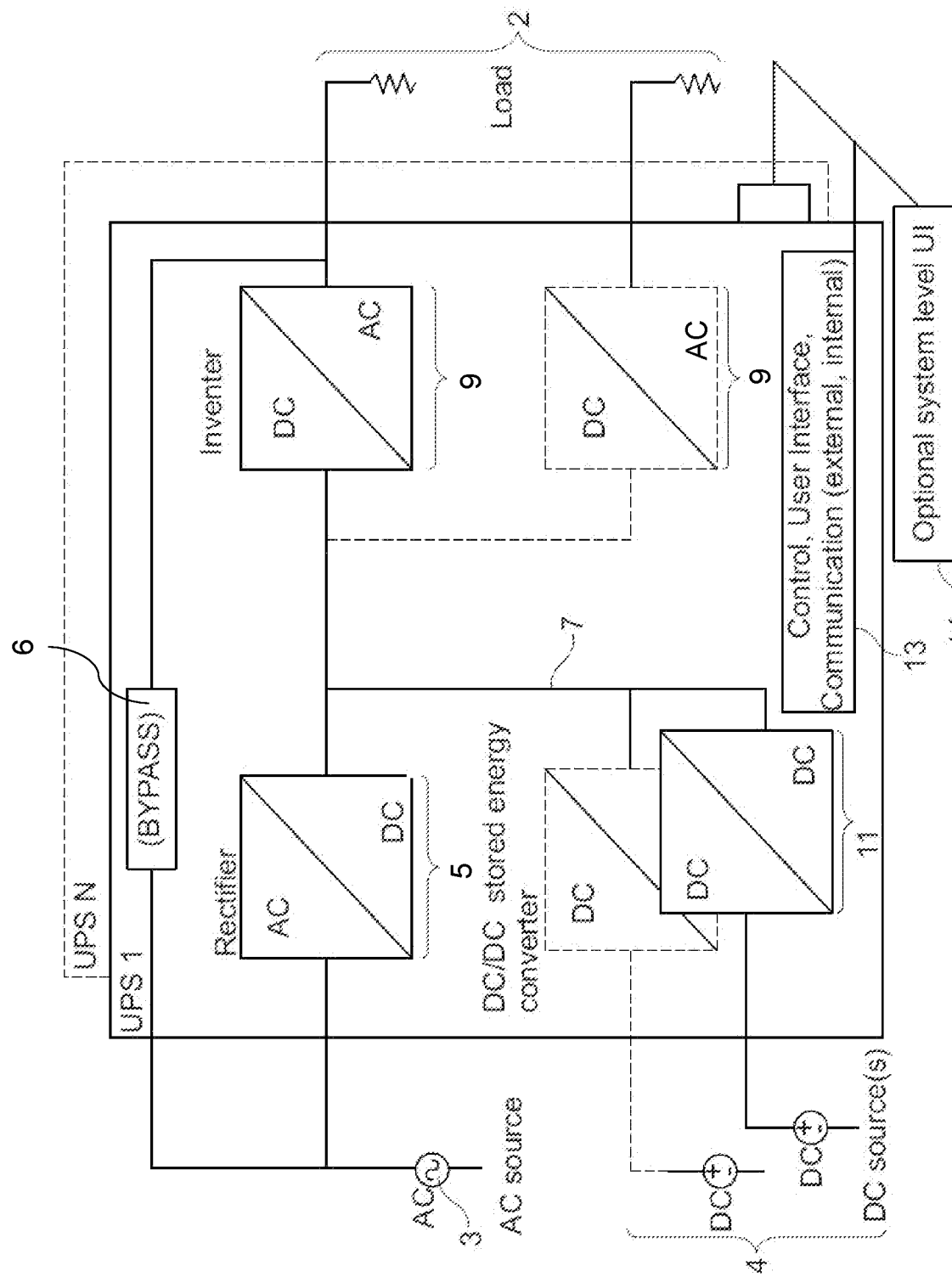
FIG. 1 shows an uninterruptible power supply, UPS, system according to a preferred implementation in a schematic view.

In an embodiment, the present invention provides an improved solution in respect to current share between parallel UPS devices in a UPS system.

In an embodiment, the present invention provides an uninterruptible power supply system, comprising:

at least one AC input terminal, an AC output terminal and an DC input terminal, at least one uninterruptible power supply, UPS, device comprising
  a DC link,
  a DC/AC converter connecting on a first side to the DC link and on a second side to the AC output terminal, and
  a DC/DC converter connecting on a first side to the DC input terminal and on second side to the DC link, and
  at least two switches and at least one coupled differential mode inductor having two windings, whereby
  each switch is connected in series with at least one winding forming a series connection, and
  the series connection is connected on a first side to the at least one AC input terminal and on a second side to the AC output terminal.

It is therefore a key point of the invention to provide by means of the series connection of the switch with at least one winding of at least one coupled differential mode inductor a very cost effective, scalable and redundant bypass structure for a UPS system. The so provided bypass allows for a current share between parallel UPS devices in the UPS system, thereby providing a robust, passively controlled, fault tolerant, in particular inherently reliable, and accurate current share for a distributed bypass architecture, in particular in case of phase split with three or more UPS devices. The series connection thereby compensates a possible current unbalance between parallel UPS devices by a current unbalance induced by the magnetically coupled windings of the coupled differential mode inductor. Thereby, each coupled differential mode inductor is connected via its two windings to two different switches. The UPS device preferably comprises a DC link, optionally a AC/DC converter, the DC/AC converter and the DC/DC converter.

The UPS system may have a stored energy source, usually referred to as 'battery', to maintain the DC link in the event of an AC source abnormal conditions so load support by the second converter assembly can be maintained without interruption. The battery is usually connected to the DC link through the DC/DC converter to allow for voltage variation of the battery due to depletion or for other characteristics. The battery is not limited to common VRLA, it may be any practical DC source including fuel cell, photovoltaic, wind or other. Multiple DC/DC converters may be connected to and operate in parallel to support the DC link. For maximal simplicity a connection to the battery is preferably only two wire. The battery respectively DC source connection to the DC link and their common internal reference/Neutral may take several forms, such as only to link positive and negative ends or to just one of the links and Neutral. The load may an AC load, a DC load or a combination thereof and/or a multiphase load.

Preferably the AC/DC converter, the DC/AC converter and/or the DC/DC converter are operated with a pulse width, PWM, modulation or PWM phase shifted with an interleaved mode. PWM is advantageous in that less control capability is required, while interleaved is advantageous for optimizing for example filter ripple. Preferably, a plurality of DC/AC converters and/or DC/DC converters are provided. The AC/DC converter, the DC/AC converter and/or the DC/DC converter preferably comprise Si, SiC and/or GaN semiconductors. Such semiconductors are characterized by improved performance, as said materials allow highly efficient operation in particular with 2-level topologies of a much simpler overall construction. SiC and/or GaN semiconductors have switching losses much smaller than legacy Si semiconductors. Thus, operation may also be advantageous in a permanent Constant Current Mode, CCM, in addition to Discontinuous Current Mode, DCM, where the slope of the current normally is allowed to go to zero before the next switching event thus greatly reducing overall losses. Said modes may be adopted and changed on an adaptive basis depending on load level and short and long term stress considerations, while potential energy throughput in CCM being generally higher.

In a preferred implementation the switch comprises and/or is provided as a thyristor, a gate turn-off thyristor, GTO, an insulated-gate bipolar transistor, IGBT, an integrated gate-commutated thyristor, IGCT, a field-effect transistor FET, a contactor, a relay, a switch, a pluggable contact and/or a plug, a mechanical switch, or any other possible switching means. In an alternative implementation the switch can be replaced by or have in parallel and/or in series electronically controlled and or manually operated contacts like but not limited to contactors, relays, switches, pluggable contacts and/or plugs.

According to another preferred implementation the switch is provided as a controlled current commutated semiconductor module and/or comprises a protective device, a controlled disconnect device and/or a measurement device connected in series with the at least one winding. The protective device is preferably provided as a fuse and/or the controlled disconnect device is preferably provided as a contactor and/or any other electrical and/or mechanical switching device, such as for example an IGBT, an GTO and/or and IGCT. The measurement device is preferably connected to a control device as described below and/or to the controlled disconnect device. Such way for example if a current measured by the measurement device exceeds a threshold the control device can open the series connection by actuating the controlled disconnect device.

In a further preferred implementation the uninterruptible power supply system comprises at least N switches and at least N, N−1 or N−2 coupled differential mode inductors each having two windings with N being an integer and ≥2, whereby at least two windings of at least two different coupled differential mode inductors are connected in series. Thus, at least two windings of separate different coupled differential mode inductors are connected in series with each current commutated semiconductor modules. Coupling windings of at least two coupled differential mode inductors in series in particular improves current share as afore mentioned issues are intrinsically solved because of circular connection.

According to another preferred implementation, the uninterruptible power supply system comprises at least N switches and at least N, N−1 or N−2 coupled differential mode inductors each having two windings with N being an integer and ≥3, whereby each at least N, N−1 or N−2 windings of at least N, N−1 or N−2 different coupled differential mode inductors are connected in series. Such implementation allows for an equally distributed line impedance among the switches since the first and the last line have the impedance of the others lines. Further, with at least two coupled differential mode inductors coupled in series single fault tolerant can be provided since failure of one switch inhibits the current balancing among the other switches. For example, there might be 4 switches, 2 coupled differential mode inductors and 1 winding (i.e. no series connection of windings from different coupled differential mode inductors), while in another case there could be 4 switches, 4 coupled differential mode inductors and each 2 windings connected in series. In another case there could be 4 switches, 16 coupled differential mode inductors with 8 windings connected in series.

In a further preferred implementation the at least one uninterruptible power supply, UPS, device comprises an AC/DC converter connected on a first side to the at least one AC input terminal and on a second side to the DC link. With such AC/DC converter the system can be operated on-line, whole in an alternate topology without AC/DC converter an off-line operation is possible such that link support and stored energy charge are performed through the DC/AC converter operating in reverse. The series connection is connected on a first side to the at least one AC input terminal and on a second side to the AC output terminal. This means for example that the series connection can be connected in parallel to the UPS device, that the series connection is connected between the AC input terminal and the AC/DC converter or that the series connection is connected in between the DC/AC converter and the AC output terminal.

According to another preferred implementation the uninterruptible power supply system comprises two, three or more phases. Preferably each phase comprises at least one series connection formed by one switch at least one winding connected in parallel. In a further preferred implementation the at least one AC input terminal and/or the AC output terminal are provided as bus bars. Said bus bars are preferably installation points of power entry for example for connecting an AC source and exit connecting a load.

In another preferred implementation the uninterruptible power supply system comprises a plurality of at least two switches and at least one coupled differential mode inductor each having two windings connected in parallel. In a further preferred implementation the series connection is integrated into the UPS device as bypass or outside the UPS device. Such way the series connection can be for example placed outside the UPS device in the current path between the DC/AC converter respectively the AC output terminal and the load. Placing inside the UPS device means for example in parallel to at least the DC/AC converter.

According to another preferred implementation the uninterruptible power supply system comprises at least two AC input terminals and at least three or four series connections, whereby at least each two series connections are connected to each one of the at least two AC input terminals.

In a further implementation, the uninterruptible power supply system comprises a control device configured for controlling the UPS system. The control device is preferably provided as a computerized means, for example as a respectively programmed microprocessor. The control device may be associated to each UPS respectively UPS device or to the UPS system thereby controlling each UPS device of the UPS system. The control device may comprise a user interface or the UPS system may comprise a system level user interface. Further, the control device may comprise communication means for communicating with other control devices and/or external devices. In a preferred implementation of the UPS the control device is configured for operating the AC/DC converter, the DC/AC converter and/or the DC/DC converters with a pulse width, PWM, modulation or PWM phase shifted with an interleaved mode. According to another preferred implementation at least two parallel DC/DC converters are provided and the control device is configured for operating the at least two DC/DC converters in parallel or time staggered for controlling energy draw off to a plurality of DC sources.

In another preferred implementation the coupled differential mode inductor is provided as a transformer. Generally, a coupled differential mode inductor cancels out magnetic flux inside a ferrite core of the inductor such that impedance is not produced for differential mode current and magnetic saturation problem is small. Coupled differential mode inductor are also referred to as differential mode choke and/or coils. The coupled differential mode inductor comprises preferably two coils respectively windings wound on a single core, whereby the windings are negative coupled in order to cancel magnetic flux produced by differential-mode, DM, currents.

FIG. 1 shows an uninterruptible power supply, UPS, system according to a preferred implementation in a schematic view. The UPS system comprises a plurality of identical UPS devices, whereas two of them are shown and referred to as UPS 1 and UPS N. The UPS system comprises at least one AC input terminal 3 for connected to an AC source 3, an AC output terminal 2 for connected to a load and at least one DC input terminal 4 connected to at least one DC source 4.

Each UPS device 1, N comprises an AC/DC converter 5, which is provided as a AC/DC rectifier and which comprises at least two independently controlled first converters. The AC/DC converter 5 is connected on a first side to the at least one AC terminal 3 and on a second side to a DC link 7, which comprises two halves with a midpoint reference. Each UPS device 1, N further comprises a DC/AC convert 9, which is provided as inverter and comprises an independently controlled second converter provided as DC/AC inverters. The DC/AC converter 9 is connected on a first side to the DC link 7 and on a second side to the AC output terminal 2. FIG. 1 shows another DC/AC converter 9 connected in parallel to the DC/AC converter 9. Alternatively, the AC/DC converter 5 can be omitted and link support and stored energy charge can be done through the DC/AC converter 9 operating in reverse.

Each UPS device 1, N even further comprises at least one DC/DC converter 11, whereas two DC/DC converters 11 are depicted in FIG. 1 and connected in parallel. Each of the two DC/DC converters 11 comprises an independently controlled third converter, which are connected on a first side via the DC input terminal 4 to the DC source 4 and on second side to the DC link 7. The third DC/DC converters 11 are provided as DC/DC stored energy converters with respective third converters. The UPS system or each UPS device 1, N further comprises a computerized control device 13 comprising a user interface and communication means for communicating with an optional UPS system level user interface 14. The first converter, the second converter and third converter comprise Si, SiC and/or GaN semiconductors.

Now also referring to FIGS. 2 to 6, the UPS system comprises a bypass 6 between the at least one AC input terminal 3 and the AC output terminal 2, which is provided as a serial connection 6 of a switch 8 and one winding 10 of a coupled differential mode inductor 12. By now referring to the implementation shown in FIG. 2, the UPS system comprise two AC input terminals 3 and one AC output terminal 2, whereas the implementation in FIGS. 3 to 6 only comprise one AC input terminal 3. Converters 5, 9 and 11 are not shown in FIGS. 2 to 6 for simplicity reasons.

Figure 2:
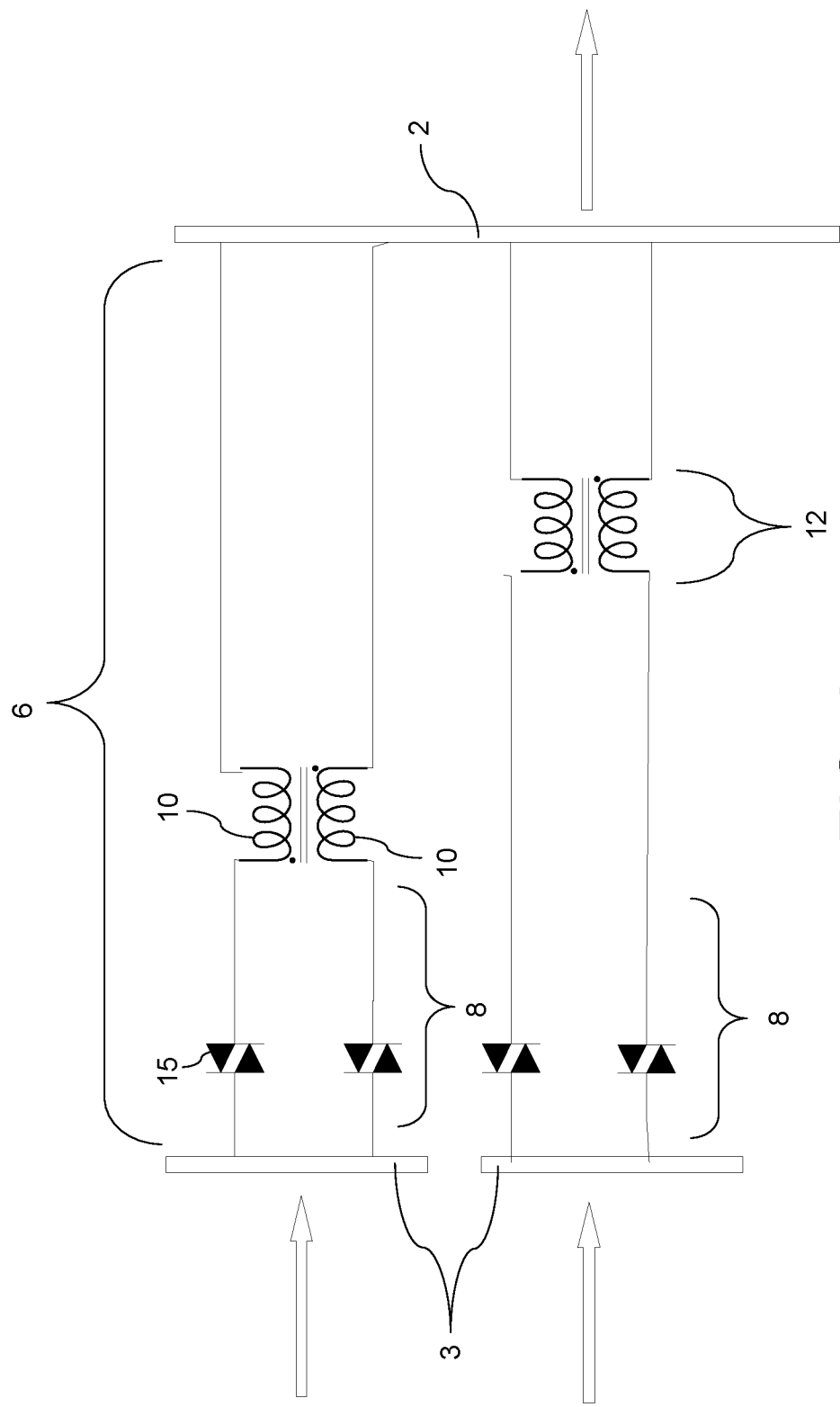
FIG. 2 shows a first preferred implementation with four switches and two coupled differential mode inductors in a schematic view.

In FIG. 2, two coupled differential mode inductors 12 having each two windings 10 are connected in parallel on one side to the AC output terminal 2. Each one winding 10 of the two coupled differential mode inductors 12 is connected in series with one of the four switches 8 to the AC input terminals 3, such that each two switches 8 are connected to one of the two AC input terminals 3. The series connection 6 of switch 8 and coupled differential mode inductor 12 compensates a possible current unbalance between parallel UPS device 1, N by a current unbalance magnetically induced by a coupling balancing voltage within the windings 10 of the coupled differential mode inductor 12.

Each of the four switches 8 comprises a silicon controlled rectifier, SCR, 15, specifically as a pair of anti-parallel thyristors connected in parallel 15. Alternatively, the switches 8 comprise a thyristor, a gate turn-off thyristor, GTO, an insulated-gate bipolar transistor, IGBT, an integrated gate-commutated thyristor, IGCT, a field-effect transistor FET, a contactor, a relay, a switch, a pluggable contact and/or a plug, a mechanical switch, as shown in FIG. 4, or any other possible switching means.

Figure 3:
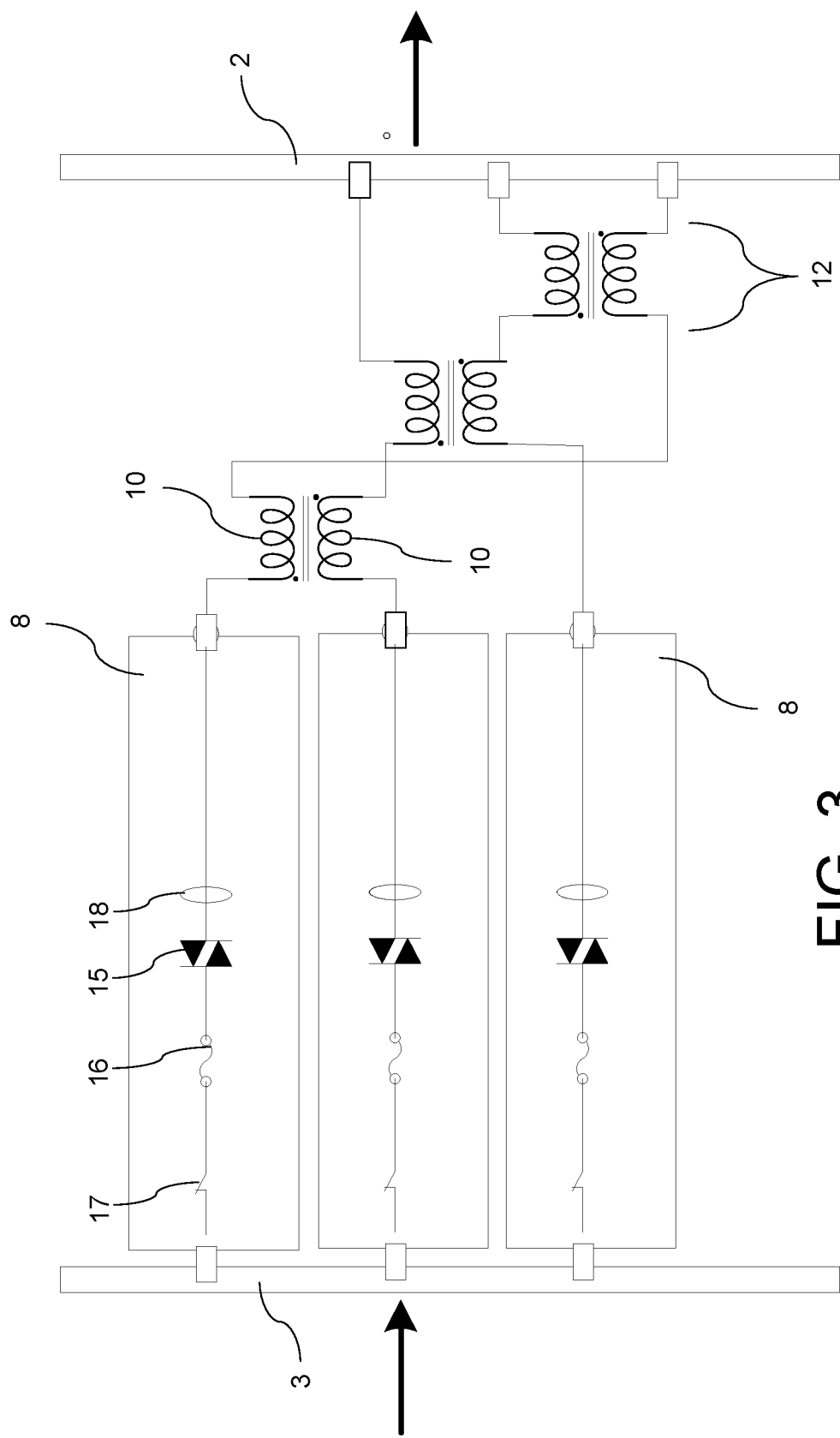
FIG. 3 shows a second preferred implementation with three switches and three coupled differential mode inductors in a schematic view.

FIG. 3 shows a further implementation with three switches 8 and three coupled differential mode inductors 12, whereby each one switch 8 is connected in series with two windings 10 of two different coupled differential mode inductors 12. Each switch 8 comprises besides the pair of anti-parallel thyristors connected in parallel 15 a protective device 16, namely a fuse, a controlled disconnect device 17, namely a mechanical and/or electric switch, and a current measurement device 18, which are all connected in series with the pair of anti-parallel thyristors connected in parallel 15 respectively the windings 10. The controlled disconnect device 17 and the current measurement device 18 are connected to the control device 13.

Figure 4:
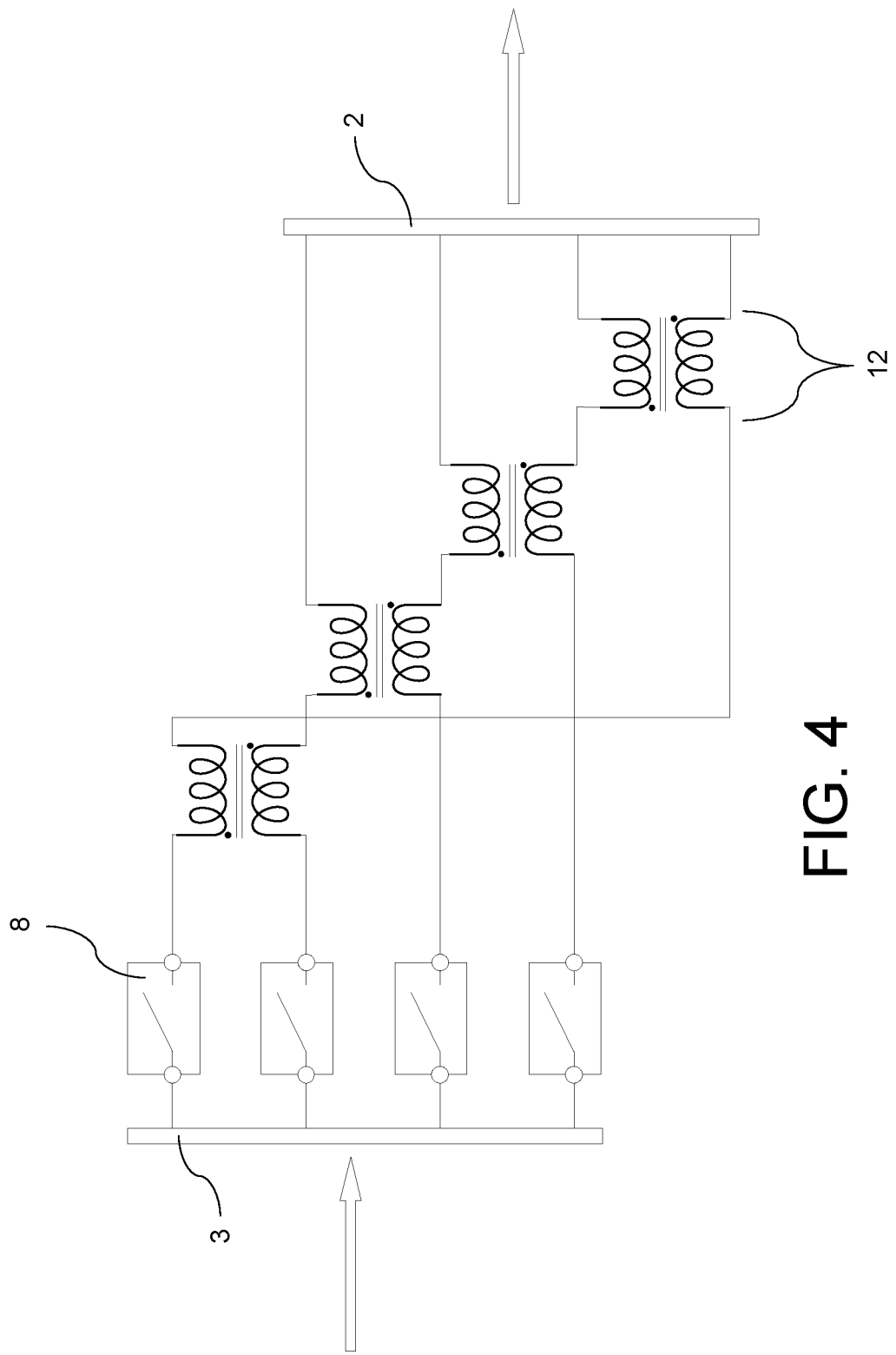
FIG. 4 shows a third preferred implementation with four switches and four coupled differential mode inductors in a schematic view.
Figure 5:
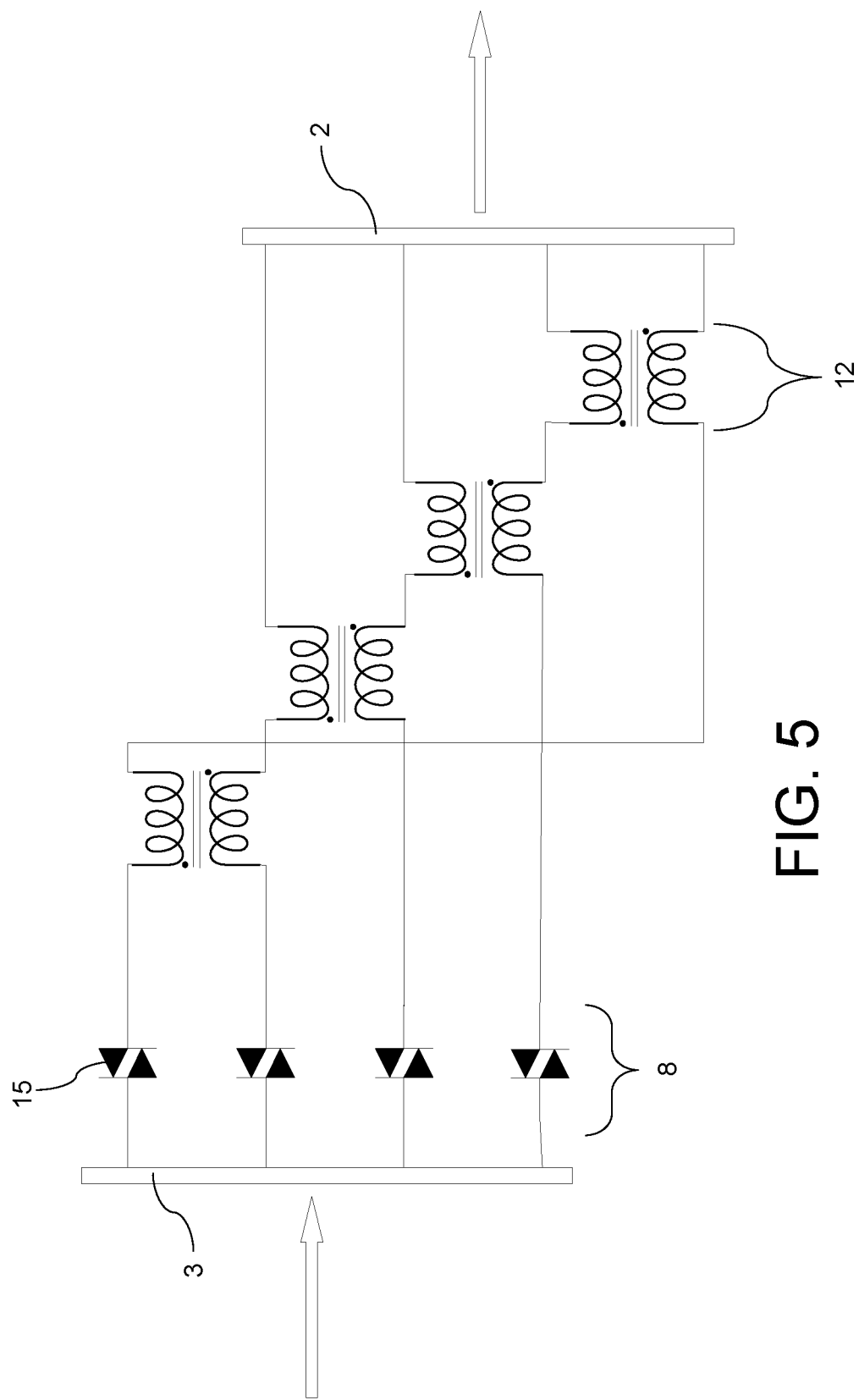
FIG. 5 shows a fourth preferred implementation with four switches and four coupled differential mode inductors in a schematic view.

FIG. 4 shows another implementation with four switches 8, each provided as a mechanical switch, and four coupled differential mode inductors 12, whereby each one switch 8 is connected in series with two windings 10 of two different coupled differential mode inductors 12. FIG. 5 shows an analogous implementation but with pairs of anti-parallel thyristors connected in parallel 15 instead of mechanical switches.

Figure 6:
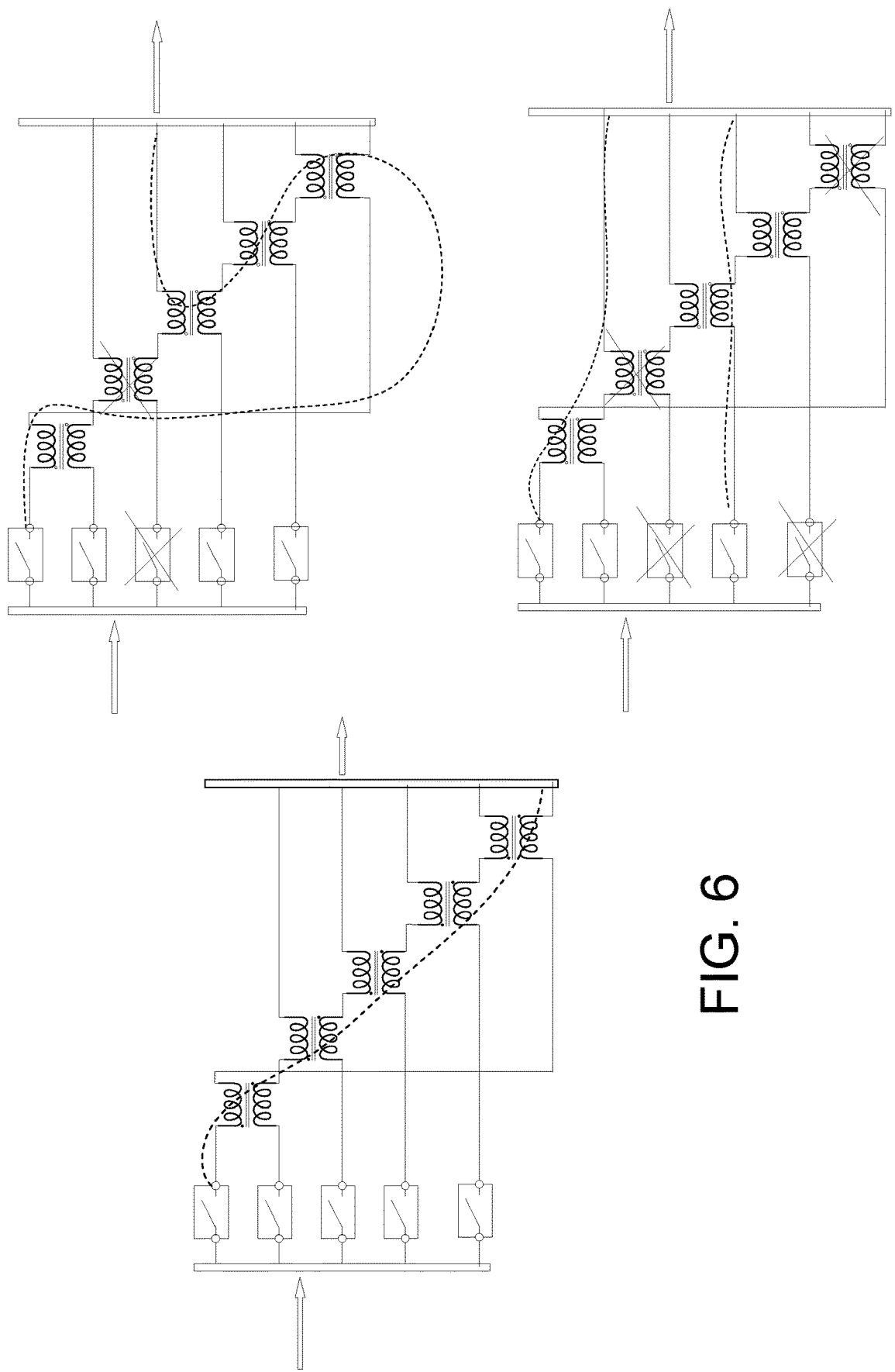
FIG. 6 shows a fifth preferred implementation with five switches and five coupled differential mode inductors in three schematic views.

FIG. 6 finally shows with a dash line magnetic coupling by the pairs of windings 10 of the coupled differential mode inductors 12. Starting with the implementation at the left, all five switches 8 are conducting such that magnetic coupling happens in all five coupled differential mode inductors 12. Now turning to the implementation at the top right side, the middle current commutated semiconductor module 8 is not conducting, while all other current commutated semiconductor modules 8 are conducing. Such wise the second coupled differential mode inductor 12 from the top is not magnetic coupling. Such way the two upmost current commutated semiconductor modules 8 and the two lowest current commutated semiconductor modules 8 are still coupled. Turning to the right low implementation both the third and the fifth current commutated semiconductor module 8, counted from the top, are not conducting. Such wise the second and fifth coupled differential mode inductors 12 do not provide magnetic coupling. In such situation current balance is not provided anymore. However, by connecting the current commutated semiconductor modules 8 with a matrix composed of N*N coupled differential mode inductors 12, N being a positive natural number, it is possible provide current balance even in this case.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS LIST

1, N UPS device
2 load, AC output terminal
3 AC source, AC input terminal
4 DC source, DC input terminal
5 AC/DC converter
6 bypass, series connection
7 DC link
8 switch, controlled current commutated semiconductor module
9 DC/AC converter
10 winding
11 DC/DC converter
12 coupled differential mode inductor
13 control device
14 user interface
15 silicon controlled rectifier, pair of anti-parallel thyristors connected in parallel
16 protective device
17 controlled disconnect device
18 measurement device

What is claimed is:

1. An uninterruptible power supply system, comprising:
at least one AC input terminal;
an AC output terminal;
a DC input terminal;
at least two uninterruptible power supply (UPS) devices, at least one of the two devices, comprising:
a DC link;
a DC/AC converter connecting on a first side to the DC link and on a second side to the AC output terminal;
a DC/DC converter connecting on a first side to the DC input terminal and on a second side to the DC link,
at least two switches; and
at least one coupled differential mode inductor having two windings,
wherein each switch of the at least two switches is connected in series with at least one winding of the at least one coupled differential mode inductor forming a series connection,
wherein the series connection is integrated into the at least one UPS device as a bypass of the at least one UPS device, and
wherein the series connection is connected on a first side to the at least one AC input terminal and on a second side to the AC output terminal.

2. The uninterruptible power supply system according to claim 1, wherein each switch of the at least two switches comprises a thyristor, a GTO, an IGBT, an IGCT, a FET, a pair of anti-parallel thyristors connected in parallel, a contactor, a relay, a switch, a pluggable contact, and/or a plug.

3. The uninterruptible power supply system according to claim 1, wherein each switch of the at least two switches comprises a controlled current commutated semiconductor module and/or a protective device, a controlled disconnect device, and/or a measurement device connected in series with at least one winding of the at least one coupled differential mode inductor.

4. The uninterruptible power supply system according to claim 1, wherein the at least two switches comprises at least N switches,
wherein the at least one coupled differential mode inductor comprises at least N, N−1, or N−2 coupled differential mode inductors each having two windings with N being an integer and ≥2, and
wherein at least two windings of at least two different coupled differential mode inductors are connected in series.

5. The uninterruptible power supply system according to claim 1, wherein the at least two switches comprises at least N switches,
wherein the at least one coupled differential mode inductor comprises at least N, N−1, or N−2 coupled differential mode inductors each having two windings with N being an integer and ≥3, and
wherein each at least N, N−1, or N−2 windings of at least N, N−1, or N−2 different coupled differential mode inductors are connected in series.

6. The uninterruptible power supply system according to claim 1, wherein the at least one UPS device comprises an AC/DC converter connected on a first side to the at least one AC input terminal and on a second side to the DC link.

7. The uninterruptible power supply system according to claim 1, wherein the uninterruptible power supply system comprises two, three, or more phases.

8. The uninterruptible power supply system according to claim 1, wherein the at least one AC input terminal and/or the AC output terminal comprise bus bars.

9. The uninterruptible power supply system according to claim 1, further comprising:
a plurality of at least two switches and at least one coupled differential mode inductor each having two windings connected in parallel.

10. The uninterruptible power supply system according to claim 1, further comprising:
at least two AC input terminals and at least four series connections,
wherein at least each two series connections are connected to each one of the at least two AC input terminals.

11. The uninterruptible power supply system according to claim 1, further comprising:
a control device configured control the uninterruptible power supply system.

12. The uninterruptible power supply system according to claim 1, wherein the coupled differential mode inductor comprises a transformer.

13. An uninterruptible power supply system, the uninterruptible power supply system comprising:
an AC input terminal configured to be connected to an AC source;
an AC output terminal configured to be connected to a DC load;
a DC input terminal configured to be connected to a DC store;
first and second uninterruptible power supply (UPS) devices, the first UPS device comprising:
a DC link;
a DC/AC converter connected on a first side to the DC link and connected on a second side to the AC output terminal;
a DC/DC converter connected on a first side to the DC input terminal and on a second side to the DC link;
a bypass connected on a first side to the AC input terminal and connected on a second side to the AC output terminal and the second side of the DC/AC converter, the bypass being configured to controllably connect the AC input terminal to the AC output terminal bypassing at least the DC/AC converter of the UPS device, the bypass comprising:
    two switches; and
    a coupled differential mode inductor comprising two windings,
wherein a first switch of the switches is connected in series with a first winding of the windings of the coupled differential mode inductor and a second switch of the switches is connected in series to a second winding of the windings of the coupled differential mode inductor, collectively forming a series connection between the AC input and the AC output.

14. The uninterruptible power supply system of claim 13, wherein the second UPS device is connected in parallel with the first UPS device between the AC input terminal and the AC output terminal,
    wherein the second UPS device comprises:
        a second DC link;
        a second DC/AC converter connected on a first side to the second DC link and connected on a second side to the AC output terminal;
        a second DC/DC converter connected on a first side to the DC input terminal and on a second side to the second DC link;
        a second bypass connected on a first side to the AC input terminal and connected on a second side to the AC output terminal and the second side of the second DC/AC converter, the second bypass being configured to controllably connect the AC input terminal to the AC output terminal bypassing at least the second DC/AC converter of the UPS device, the second bypass comprising:
            a third switch and a fourth switch; and
            a second coupled differential mode inductor comprising two windings,
    wherein the third switch is connected in series with a first winding of the windings of the second coupled differential mode inductor and a fourth switch is connected in series to a second winding of the windings of the second coupled differential mode inductor, collectively forming a second series connection between the AC input and the AC output, and,
    wherein the series connection and the second series connection are in parallel.

15. The uninterruptible power supply system of claim 13, wherein the first UPS device comprises an AC/DC converter connected on a first side to the AC source and connected on a second side to the DC link, wherein the bypass is configured to controllably connect the AC input terminal to the AC output terminal bypassing at least the DC/AC converter and the AC/DC converter of the first UPS device.

* * * * *